United States Patent
Warren et al.

(10) Patent No.: US 7,366,938 B2
(45) Date of Patent: Apr. 29, 2008

(54) RESET IN A SYSTEM-ON-CHIP CIRCUIT

(75) Inventors: Robert Warren, Thornbury (GB); David Smith, Bradley Stoke (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 479 days.

(21) Appl. No.: 11/175,108

(22) Filed: Jul. 5, 2005

(65) Prior Publication Data

US 2006/0036888 A1 Feb. 16, 2006

(30) Foreign Application Priority Data

Jul. 5, 2004 (EP) .................................. 04254030

(51) Int. Cl.
*G06F 15/177* (2006.01)
*G06F 1/12* (2006.01)

(52) U.S. Cl. ............... 713/400; 713/401; 713/500; 713/501; 713/502; 713/503; 713/600; 713/601; 709/248; 375/354; 370/503; 327/141

(58) Field of Classification Search ........ 713/400–401, 713/500, 501–503, 600–601; 709/248; 375/354; 370/503; 327/171
See application file for complete search history.

(56) References Cited

U.S. PATENT DOCUMENTS

| | | | |
|---|---|---|---|
| 5,457,660 A | 10/1995 | Ito | |
| 6,134,656 A * | 10/2000 | LaBerge | 713/1 |
| 6,260,152 B1 | 7/2001 | Cole et al. | |
| 6,262,594 B1 * | 7/2001 | Cheung et al. | 326/38 |
| 6,665,795 B1 | 12/2003 | Roth et al. | |
| 6,748,039 B1 * | 6/2004 | Bates | 375/354 |
| 6,880,026 B2 * | 4/2005 | Imming et al. | 710/106 |
| 6,885,714 B1 * | 4/2005 | Matthews et al. | 375/354 |
| 6,977,980 B2 * | 12/2005 | Chang et al. | 375/354 |
| 7,003,423 B1 * | 2/2006 | Kabani et al. | 702/120 |
| 7,231,539 B1 * | 6/2007 | Lee et al. | 713/600 |

OTHER PUBLICATIONS

European Search Report from European Patent Application No. 04254030.2, filed Jul. 5, 2004.

* cited by examiner

*Primary Examiner*—Abdelmoniem Elamin
(74) *Attorney, Agent, or Firm*—Lisa K. Jorgenson; James H. Morris; Wolf, Greenfield & Sacks, P.C.

(57) ABSTRACT

An electronic device having first circuitry operating in a first clock environment and second circuitry operating in a second clock environment, the first circuitry being arranged to generate a soft reset signal for resetting the second circuitry, the integrated circuit further including: a soft reset hold circuit clocked in the first clock environment connected to receive the soft reset signal and to generate an output reset signal in an asserted state; and a synchronizer clocked in the second clock environment connected to receive the output reset signal and to generate a retimed reset signal in an asserted state after a predetermined period, wherein the retimed reset signal is fed back to the soft reset hold circuit to cause the output reset signal to adopt a deasserted state at the end of said predetermined period.

23 Claims, 4 Drawing Sheets

RESET IN A SYSTEM-ON-CHIP CIRCUIT

BACKGROUND OF THE INVENTION

1. Field of the Invention

This invention relates to reset in a system-on-chip circuit, in particular where there are two clock environments governing the operation of the circuitry on an integrated circuit.

2. Discussion of the Related Art

FIG. 1 illustrates a system on-chip (SoC) in the form of an integrated circuit including a central processing unit (CPU) 2 and functional logic 4. The system-on-chip generally operates on an input data stream IDS (e.g. video, audio, etc) and generates a processed output data stream ODS.

As in known in the art, the functional logic 4 within the system-on-chip integrated circuit may often need to be reset. By convention, reset signalling is performed using an active low signal and therefore given a name with a "_n" postfix to identify these signals as active low signals. Thus, rst_n=1 means that this is inactive, deasserted or not reset, while rst_n=0 means active, asserted or reset.

There are two types of reset signal which are frequently used in integrated circuit systems. A hard reset is defined as a reset which originates from logic external to the system-on-chip 1 and is labelled in FIG. 1 as rst_n. A hard reset is usually asynchronous with respect to any clock within the system-on-chip 1. In the case of FIG. 1, the system-on-chip runs as a single clock environment using a clock clk1.

A soft reset is defined as a reset which originates from logic within the system-on-chip, in the case of FIG. 1 from the embedded CPU 2, or rather from the effects of a program running on the embedded CPU 2. The soft reset signal is labelled soft_rst_n. A reset synchronizer 8 is connected to receive the hard reset signal rst_n. An important property of reset synchronizer 8 is that the assertion of rst_n is passed through to the output of 8 (rst_sync_n) asynchronously, but the deassertion of rst_n is delayed by being synchronized to a subsequent clock edge before being passed through to rst_sync_n. This is important because rst_n may be asserted when clocks are not running, or not stable, such as when power is first applied to the SoC, but the deassertion of rst_sync_n needs to be synchronous with all destinations to avoid metastability. The output of the reset synchronizer 8 is supplied to the logic 4 and the CPU 2.

FIG. 1 shows the case where the output of the CPU 2 soft_rst_n is fed directly into the logic 4 as a synchronous signal. It is also possible to merge the soft reset with the hard reset and distribute a single reset to the logic 4. This merging of the soft reset and hard reset could be done in the reset synchronizer 8. In such a case, the merged output rst_merged_n would not normally be fed back as the main reset input to the CPU 2. Therefore a second reset synchronizer is required. The input to the second reset synchronizer would be rst_n and clk1, and the output of the second reset synchronizer would be connected to the CPU 2.

FIG. 1 illustrates a system on-chip 1 with a single clock environment (clock clk1). A problem arises when the system contains more than one clock environment. FIG. 2 illustrates a system on-chip 10 having an embedded CPU 2 and functional logic 14. In this case, the embedded CPU is controlled by a first clock signal clk1, while the functional logic 14 is controlled by a second clock signal clk2. In this case, a problem arises with the use of soft reset signals generated by the CPU and in fact currently there is no mechanism to allow these types of reset signals. A hard reset signal rst_n is synchronized into the first clock domain via suitable reset synchronization logic 8 and into the second clock domain via an additional reset synchronizer 18.

The reason is that when a soft reset signal comes from a different clock environment, two conditions have to be met. Firstly, if the soft reset is a pulse, it must be seen and cause a clean reset of the local logic 14. If the clock environment of the soft reset (clk1) is faster than the local logic (clk2), then the pulse will not be seen. Secondly, any signals which cross clock environments must have adequate synchronization to avoid metastability problems.

Furthermore, if the soft reset is held for a longer period of time, then the local logic must also be held in reset.

SUMMARY OF THE INVENTION

It is an aim of the present invention to allow a soft reset signal to cross clock boundaries.

According to an aspect of the present invention there is provided an electronic device having first circuitry operating in a first clock environment and second circuitry operating in a second clock environment, the first circuitry being arranged to generate a soft reset signal for resetting the second circuitry, the electronic device further comprising: a soft reset hold circuit clocked in the first clock environment connected to receive the soft reset signal and to generate an output reset signal in an asserted state; and a synchronizer clocked in the second clock environment connected to receive the output reset signal and to generate a retimed reset signal in an asserted state after a predetermined period, wherein the retimed reset signal is fed back to the soft reset hold circuit to cause the output reset signal to adopt a deasserted state at the end of said predetermined period.

The electronic device can comprise an integrated circuit.

In the described embodiment, the soft reset hold circuit comprises a flip-flop and associated logic for maintaining the soft reset signal in an asserted state.

The associated logic can comprise an AND gate and an OR gate.

Preferably, the predetermined period is governed by the second clock environment. In the described embodiment, the synchronizer comprises two serially connected flip-flops and in that case the predetermined time period is two clock cycles of the second clock.

In the described embodiment, the first circuitry is a CPU. The second circuitry can also comprise a CPU.

It is particularly advantageous if the soft reset hold circuit and synchronizer also receives a hard reset signal and generates an output which falls asynchronously when the hard reset signal is asserted, but only rises synchronously (and in the described embodiment where the synchronizer comprises two flip-flops, after two clock cycles). This achieves the requirement for asynchronous reset and synchronous deassertion of a hard reset, while simultaneously dealing with the metastability and synchronization issues of a soft reset signal.

The integrated circuit can include a further synchronizer operating in the first clock environment and connected to receive the hard reset signal and to supply a synchronized output signal to reset the first circuitry.

There can be a plurality of second circuitry each with an independent second clock.

Another aspect of the invention provides a method of transferring a soft reset signal from a first clock environment to a second clock environment, the method comprising: supplying the soft reset signal to a soft reset hold circuit clocked in the first clock environment, the soft reset hold circuit being arranged to generate an output reset signal in an assertive state; supplying the output reset signal to a synchronizer clocked in the second clock environment and arranged to generate a retimed reset signal in an assertive state after a predetermined period; and feeding back the retimed reset signal to the soft reset hold circuit to cause the output reset signal to adopt a deassertive state at the end of said predetermined period.

The integrated circuit can be used to advantage as part of a system-on-chip which has an input for receiving a data stream and an output for supplying a process data stream. Such a system might be for example a DVD decoder or a set top box. The invention is not restricted to these examples and any appropriate systems could be used.

Another aspect of the invention provides an electronic device comprising at least one first chip operating in a first clock environment and at least one second chip operating in a second clock environment, the first chip being arranged to generate a soft reset signal for resetting circuitry of the second chip, the system further comprising: a soft reset hold circuit clocked in the first clock environment connected to receive the soft reset signal and to generate an output reset signal in an asserted state; and a synchronizer clocked in the second clock environment connected to receive the output reset signal and to generate a retimed reset signal in an asserted state after a predetermined period, wherein the retimed reset signal is fed back to the soft reset hold circuit to cause the output reset signal to adopt a deasserted state at the end of said predetermined period.

That is, features of the invention can be utilised in a multi-chip application so as to synchronise two or more different chips. Set Top Boxes, DVD players and other system can be implemented as single-chip or multi-chip systems.

BRIEF DESCRIPTION OF THE DRAWINGS

For a better understanding of the present invention and to show how the same may be carried into effect, reference will now be made by way of example to the accompanying drawings, in which.

DETAILED DESCRIPTION

Figure 1:
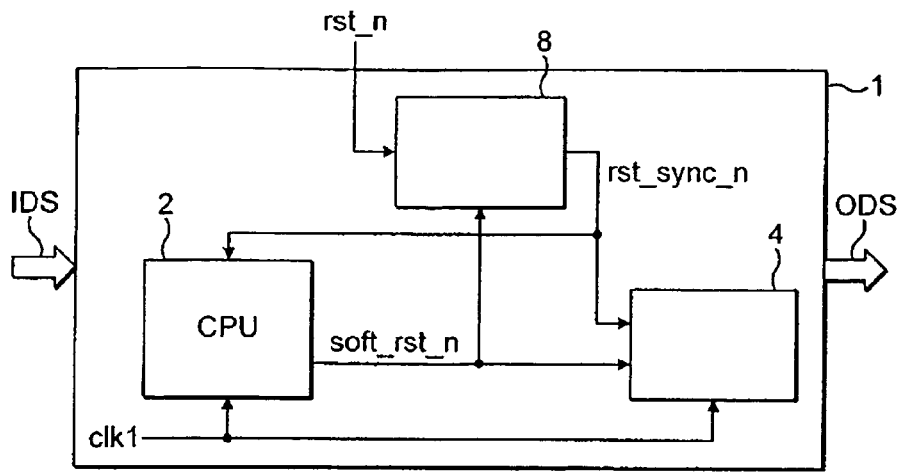
FIG. 1 is a schematic block diagram of a system-on-chip with a single clock environment.
Figure 2:
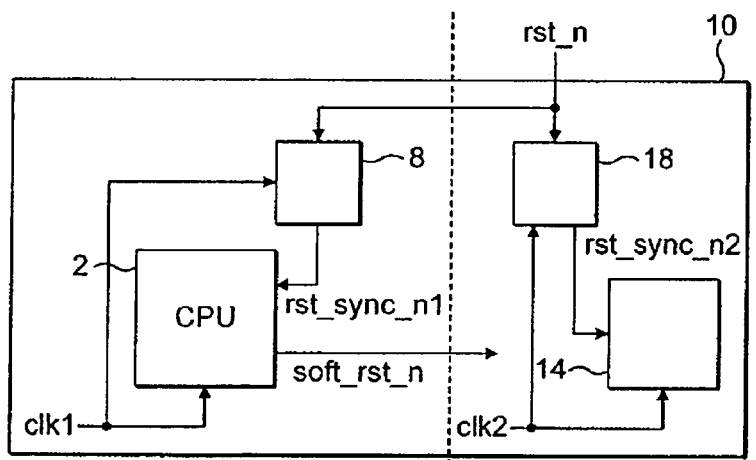
FIG. 2 is a schematic block diagram of a system-on-chip with two clock environments.
Figure 3:
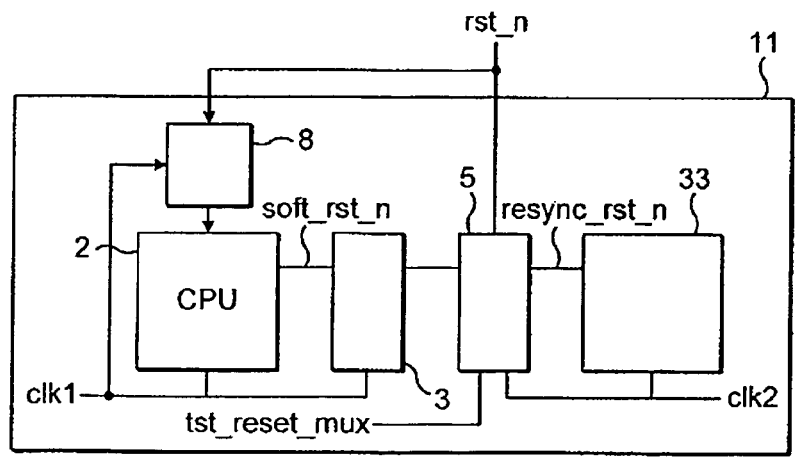
FIG. 3 is a schematic diagram of a system-on-chip architecture in accordance with one embodiment of the invention.

FIG. 3 illustrates schematically the environment of a system-on-chip 11 implementing an embodiment of the invention. The system on-chip 11 comprises an embedded CPU 2 operating in the first clock environment clk1 and which issues a soft reset signal soft_rst_n and supplies it to a soft reset hold circuit 3. Reference numeral 5 denotes a reset synchronizer which supplies a synchronization signal resync_rst_n to embedded functional logic 33 which operates in the second clock environment clk2. The soft reset hold circuit 3 receives the first clock clk1, while the synchronizer 5 receives the second clock clk2. A reset synchronizer 8 for a hard reset signal rst_n operates in the first clock environment as already described.

Figure 4:
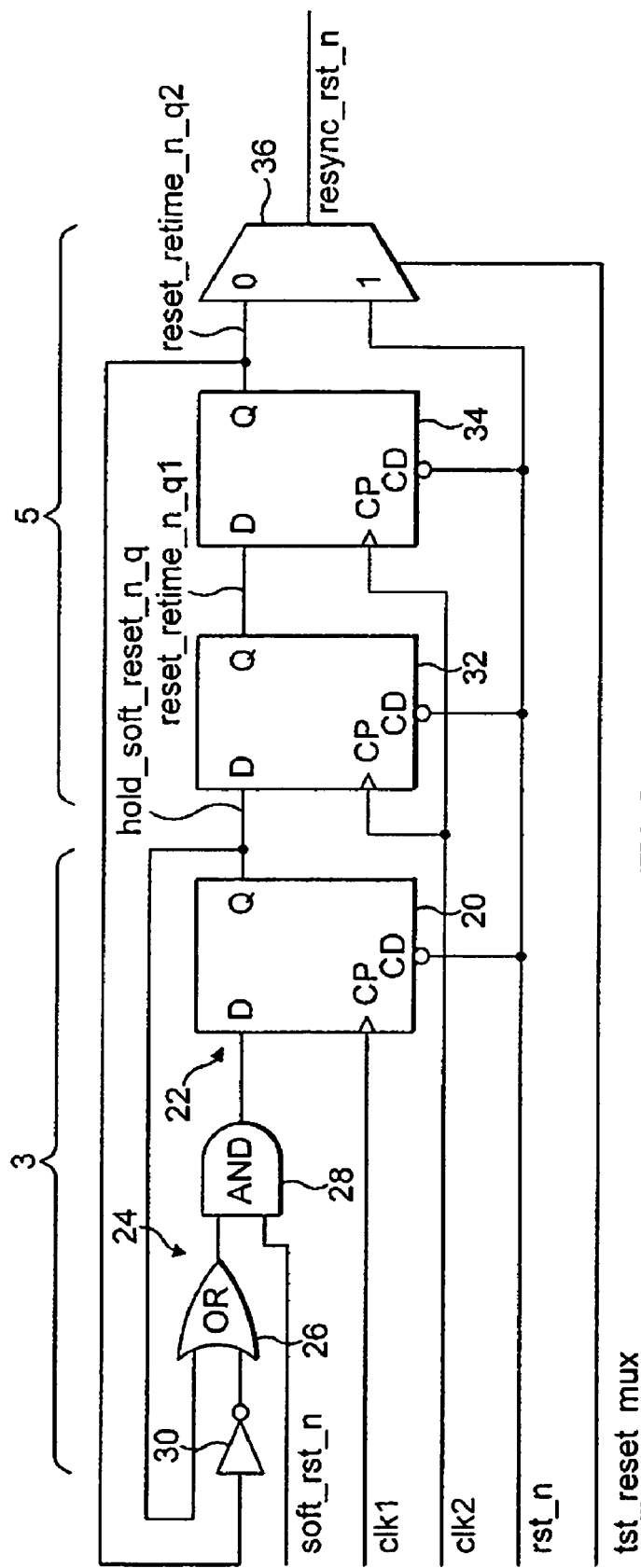
FIG. 4 is a schematic circuit diagram of a soft reset hold circuit and a synchronizer.

FIG. 4 illustrates the circuit structure according to one embodiment of the present invention. The soft reset hold circuit comprises a first flip-flop 20 which receives a clock signal from the first clock environment clk1. The flip-flop 20 has its CD input connected to receive a hard reset signal rst_n and its D input set to receive an input signal 22 derived from a logic circuit 24. The CD input is an asynchronous clear input which resets the flip-flop, making the Q output a logic zero, independently of the clock input CP, whenever this input is asserted low. The logic circuit 24 comprises an OR gate 26 the output of which supplies one input of an AND gate 28. The other input of the AND gate 28 is connected to receive the soft reset signal soft_rst_n, and the output of the AND gate constitutes the input 22 for the D input of the flip-flop 20. One input of the OR gate 26 receives a signal taken at the Q output of the flip-flop 20. This signal represents the soft reset signal held by the flip-flop, and is labelled hold_soft_reset_n_q. The other input to OR gate 26 is fed from the Q output of a flip-flop 34 (discussed later) via an inverter 30.

FIG. 4 also illustrates the reset synchronizer 5. The reset synchronizer 5 comprises second and third flip-flops 32, 34 each having their clock inputs connected to the clock for the second clock environment, labelled clk2. Their reset inputs are set to receive the hard reset signal rst_n. The D input of the second flip-flop 32 receives the held soft reset signal from the Q output of the flip-flop 20. The Q output of the second flip-flop 32 feeds the D input of the third flip-flop 34 with a signal labelled reset_retime_n_q1. The Q output of the third flip-flop 34 labelled reset_retime_n_q2 is supplied to a first input of a multiplexer 36 and additionally fed back to the second input of the OR gate 26 via the inverter 30. A second input of the multiplexer 36 receives the hard reset signal rst_n and supplies as its output a resynchronized reset signal resync_rst_n. This signal can be used to reset functional logic in the second clock environment. The multiplexer 36 is controlled by a scan test signal tst_reset_mux, such that, for structural test when tst_reset_mux is asserted, the hard reset rst_n, bypasses the flip-flops 32 and 34, thus giving full test control of the reset signal to the functional logic, resync_rst_n, and allowing the flip-flops 32 and 34 to be structurally tested using scan test.

Figure 5:
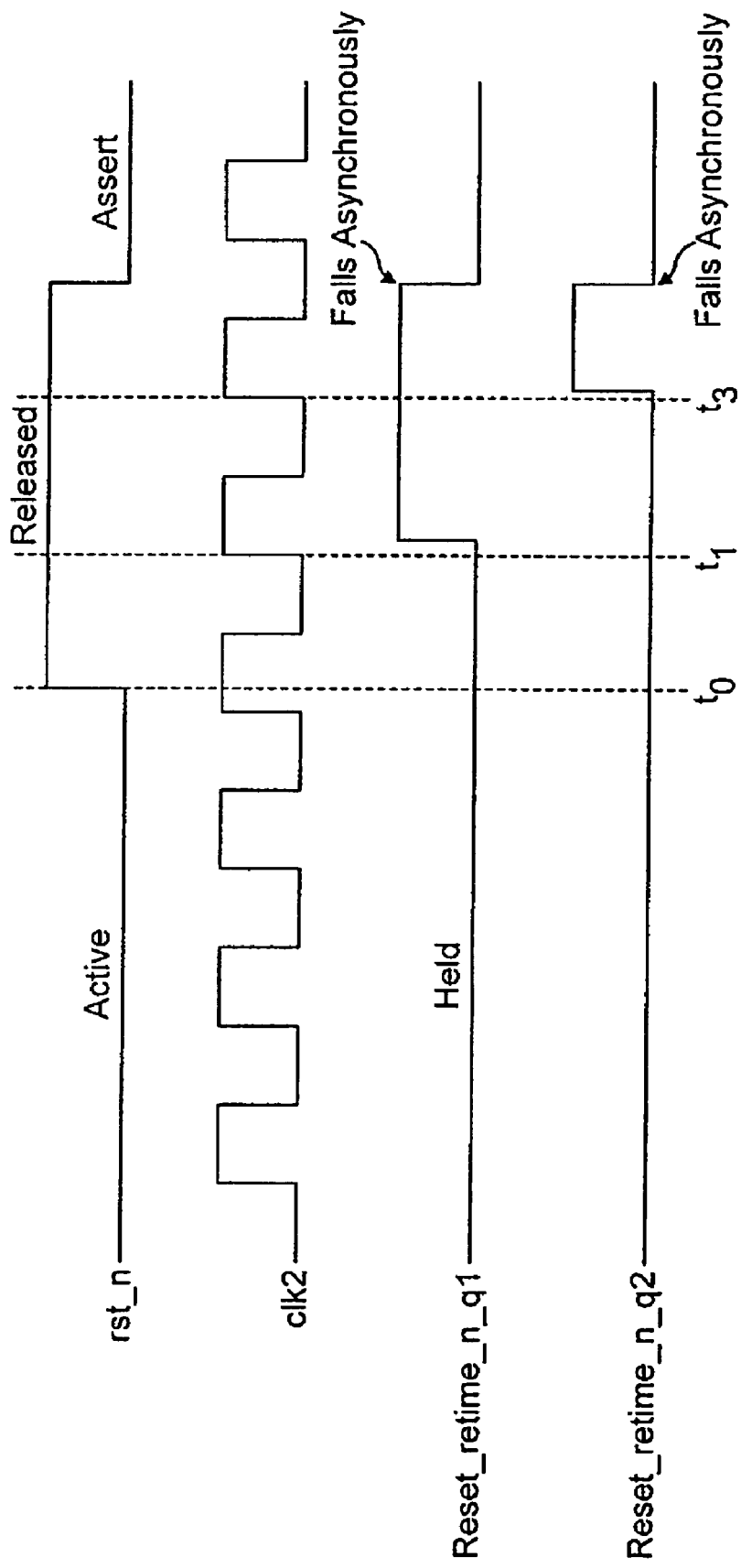
FIG. 5 is a timing diagram for operation of the circuit of FIG. 4 with a hard reset signal.

FIG. 5 is a timing diagram which illustrates operation of the synchronizer 5, in the case where the D input of flip-flop 32 is held high. The operation of the synchronizer 5 will firstly be described in connection with functional operation when tst_reset_mux=0 and both flip-flops 32, 34 are asynchronously reset directly from the hard reset input rst_n. When the hard reset signal is released at time t0, asynchronously with respect to the clock clk2, the D input of the second flip-flop 32 is clocked into the second flip-flop and its output is clocked into the third flip-flop 34. Assuming therefore that the signal on the D input of the second flip-flop 32 was high, this will appear at the output of the second flip-flop following the next rising edge of clk_1 at time t1. Similarly, the output of the third flip-flop 34 goes high only after a further clock period at time t3. However, as soon as the reset signal rst_n is asserted (falls low), the outputs of the first and second flip-flops also fall low straight away as a result of the reset action of the flip-flops. Thus, the arrangement of the two flip-flops means that the output from the second flip-flop falls to zero asynchronously when rst_n is asserted, but only rises to one, synchronously, after two clock cycles. This achieves asynchronous assertion of reset and synchronous deassertion of reset. It is to be noted that since the second flip-flop is clocked asynchronously with respect to the reset signal applied to its reset input, the flip-flop could go metastable. However, the presence of the third flip-flop prevents the metastability risk from propagating.

The multiplexer 36 ensures that when the tst_reset_mux=1, the output from the flip-flops is ignored. This allows the flip-flops to be scan tested by allowing the asynchronous reset to be directly controllable by external test equipment.

Where the D input to the second flip-flop 32 is the hold_soft_reset_n_q signal from the soft reset hold circuit 3, this means that the soft reset can be applied as a pulse, lasting for one clock cycle of the first clock environment clk1 or for longer. The output from the reset synchronizer resync_rst_n is guaranteed to be asserted low for a minimum of two clock cycles (see the period t0 to t3 in FIG. 5).

Figure 6:
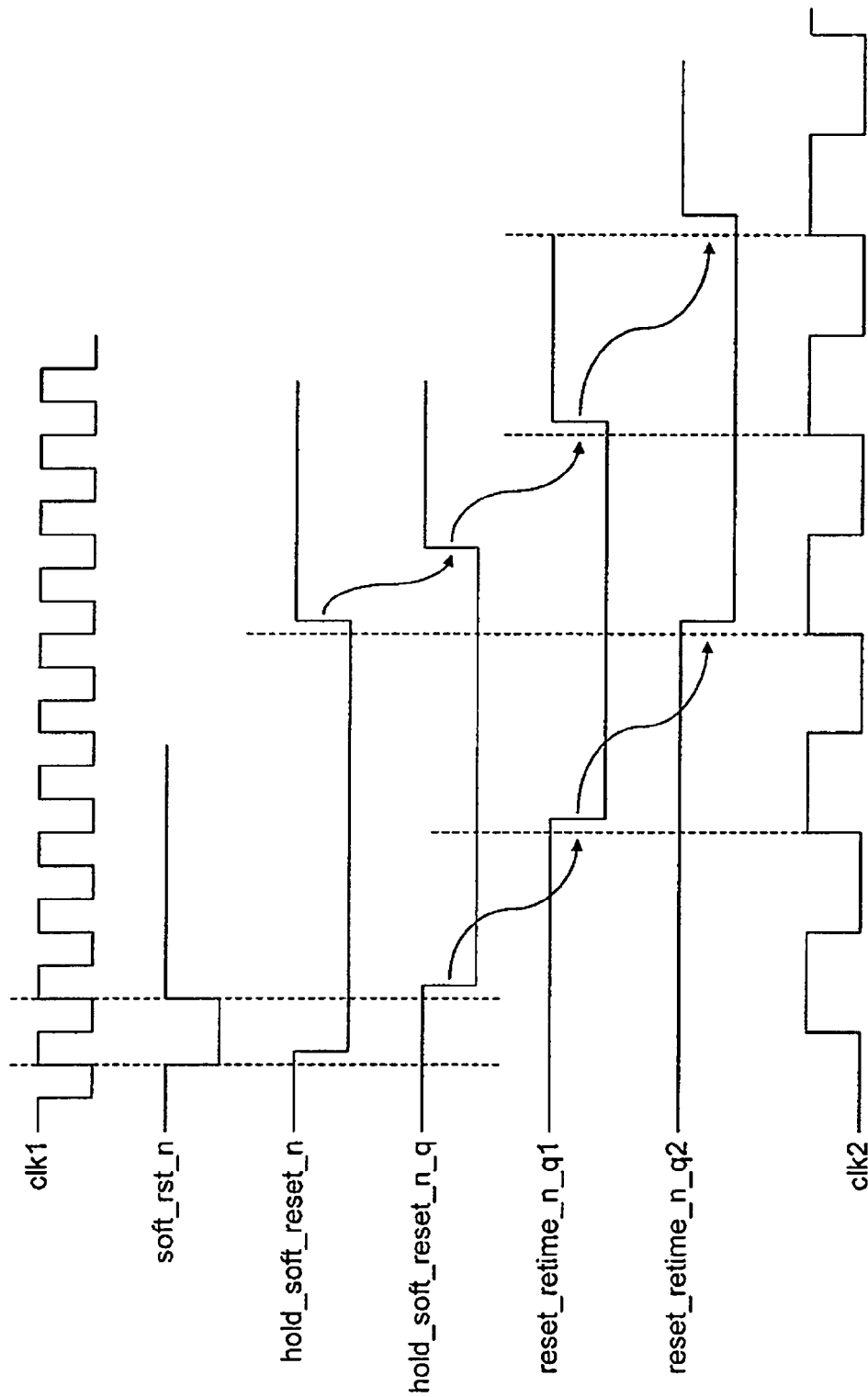
FIG. 6 is a timing diagram for operation of the circuit of FIG. 4 with a soft reset signal.

Operation of transfer of the soft reset signal will now be described with reference to FIG. 6. When the soft reset signal is asserted (goes low), the D input hold_soft_reset_n of the flip-flop 20 is low, so on the next clock cycle of clk1 the Q output hold_soft_reset_n_q will go low. When the soft reset signal is deasserted (goes high), the D input hold_soft_reset_n is held low due to the fed back signal hold_soft_rst_n_q so on the next clock cycle of clock clk1, the output hold_soft_reset_n_q stays low, even through the soft reset signal is deasserted. This low level is clocked through the flip-flops 32, 34 of the synchronizer 5 to the output resync_rst_n by the second clock clk2, so this remains low (asserted) even though the soft reset has been deasserted.

The low level signal is propagated to the synchronizer until it arrives at the output reset_retime_n_q2. It is fed back, inverted via inverter 30 to the OR gate 26, thereby changing the input hold_soft_reset_n to a high level. This level then gets clocked through as shown in FIG. 6.

Thus, the combination of the soft reset hold circuit 3 and the standard reset synchronizer 5 feed a legal combination of soft or hard reset signals to the asynchronous reset inputs of a plurality of flip-flops. The output from the second synchronizer flip-flop 34 is fed back into the hold logic 24 for the soft reset such that the hold is only released after a minimum of two clock cycles of resync_rst_n asserted low.

The advantages of this design are:

It captures a one cycle soft reset pulse from an independent clock environment it sustains an output reset when the soft reset input is sustained it synchronises the soft reset from an independent clock environment and avoids metastability issues it allows soft reset and hard reset signals to be merged through a single circuit it guarantees an output reset lasting a minimum of two clock cycles the length of the output reset can be modified by using a different number of flip-flops connected serially in the reset synchronizer 5 it immediately and asynchronously propagates the asynchronous assertion of reset so that reset is effective even when clocks are not running or not stable it synchronises the deassertion of a hard reset and avoid metastability issues all the logic and flip-flops are scan testable the reset output is directly controlled by the hard reset input during scan test it reduces the amount of logic in a destination environment because only a single combined reset is distributed to the asynchronous inputs of a large number of flip-flops.

In the above-described embodiment, a single integrated circuit with two clock environments has been described. It will readily be appreciated that the principles underlying the invention can be implemented in a situation where there are two or more chips with differing clock environments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An electronic device having first circuitry operating in a first clock environment and second circuitry operating in a second clock environment, the first circuitry being arranged to generate a soft reset signal for resetting the second circuitry, the integrated circuit further comprising:
a soft reset hold circuit clocked in the first clock environment connected to receive the soft reset signal and to generate an output reset signal in an asserted state; and
a synchronizer clocked in the second clock environment connected to receive the output reset signal and to generate a retimed reset signal in an asserted state after a predetermined period,
wherein the retimed reset signal is fed back to the soft reset hold circuit to cause the output reset signal to adopt a deasserted state at the end of said predetermined period.

2. An electronic device according to claim 1, wherein the soft reset hold circuit comprises a flip-flop and associated logic.

3. An electronic device according to claim 2, wherein the associated logic comprises an OR gate having as one input the output reset signal of the soft reset hold circuit and an output connected to one input of an AND gate, wherein another input of the AND gate is connected to receive the soft reset signal.

4. An electronic device according to claim 1, wherein the predetermined time period is related to the second clock environment.

5. An electronic device according to claim 1, wherein the synchronizer comprises a plurality of serially-connected flip-flops.

6. An electronic device according to claim 5, wherein the predetermined time period comprises a fixed number of clock cycles of the second clock.

7. An electronic device according to claim 6, wherein the synchronizer comprises first and second serially connected flip-flops, and the predetermined time period comprises two clock cycles of the second clock.

8. An electronic device according to claim 1, wherein the first circuitry comprises a CPU.

9. An electronic device according to claim 1, wherein the soft reset hold circuit and the synchronizer are connected to receive a hard reset signal.

10. An electronic device according to claim 9, comprising a multiplexer having a first input connected to receive the retimed reset signal and a second input connected to receive the hard reset signal, the multiplexer being controllable by a test signal to selectively connect one of the first and second inputs to an output of the multiplexer.

11. An electronic device according to claim 9, which comprises a further synchronizer clocked in the first clock environment and connected to receive the hard reset signal and to supply a synchronized reset output signal to the first circuitry.

12. An electronic device according to claim 1, wherein the second circuitry comprises a CPU.

13. An electronic device according to claim 1, wherein there is a plurality of second circuitry each with an independent second clock.

14. An electronic device according to claim 1, comprising an integrated circuit.

15. A system-on-chip comprising an integrated circuit according to claim 14, and having an input for receiving a data stream and an output for supplying a processed data stream.

16. A system-on-chip according to claim 15, which comprises a DVD decoder.

17. A system-on-chip according to claim 15, which comprises a Set Top Box.

18. A DVD player comprising an electronic device according claim 1.

19. A Set Top Box comprising an electronic device according to claim 1.

20. A electronic device comprising at least one first chip operating in a first clock environment and at least one second chip operating in a second clock environment, the first chip being arranged to generate a soft reset signal for resetting circuitry of the second chip, the system further comprising:

a soft reset hold circuit clocked in the first clock environment connected to receive the soft reset signal and to generate an output reset signal in an asserted state; and a synchronizer clocked in the second clock environment connected to receive the output reset signal and to generate a retimed reset signal in an asserted state after a predetermined period, wherein the retimed reset signal is fed back to the soft reset hold circuit to cause the output reset signal to adopt a deasserted state at the end of said predetermined period.

21. A DVD player comprising an electronic device according to claim 20.

22. A Set Top Box comprising an electronic device according to claim 20.

23. A method of transferring a soft reset signal from a first clock environment to a second clock environment, the method comprising:

supplying the soft reset signal to a soft reset hold circuit clocked in the first clock environment, the soft reset hold circuit being arranged to generate an output reset signal in an assertive state;

supplying the output reset signal to a synchronizer clocked in the second clock environment and arranged to generate a retimed reset signal in an assertive state after a predetermined period; and feeding back the retimed reset signal to the soft reset hold circuit to cause the output reset signal to adopt a deassertive state at the end of said predetermined period.

* * * * *